(12) United States Patent
Nonaka et al.

(10) Patent No.: US 11,813,825 B2
(45) Date of Patent: Nov. 14, 2023

(54) LAMINATE

(71) Applicant: KURARAY CO., LTD., Okayama (JP)

(72) Inventors: Yasuhiro Nonaka, Kurashiki (JP); Tatsuya Oshita, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 56 days.

(21) Appl. No.: 17/762,941

(22) PCT Filed: Sep. 24, 2020

(86) PCT No.: PCT/JP2020/035896
§ 371 (c)(1),
(2) Date: Mar. 23, 2022

(87) PCT Pub. No.: WO2021/060308
PCT Pub. Date: Apr. 1, 2021

(65) Prior Publication Data
US 2022/0388286 A1 Dec. 8, 2022

(30) Foreign Application Priority Data

Sep. 24, 2019 (JP) .................................. 2019-173524

(51) Int. Cl.
*B32B 27/08* (2006.01)
*B32B 27/30* (2006.01)
*B32B 27/40* (2006.01)

(52) U.S. Cl.
CPC ............ *B32B 27/08* (2013.01); *B32B 27/306* (2013.01); *B32B 27/40* (2013.01); *B32B 2250/05* (2013.01); *B32B 2250/24* (2013.01); *B32B 2250/42* (2013.01); *B32B 2307/7242* (2013.01); *B32B 2307/732* (2013.01)

(58) Field of Classification Search
CPC .. H01G 9/2022; H01G 9/2027; H01G 9/2031; H01G 9/2059; H01G 9/2077; Y02E 10/542; B32B 2250/05; B32B 2250/24; B32B 2250/42; B32B 2307/7242; B32B 2307/732; B32B 27/08; B32B 27/306; B32B 27/40; B32B 2250/40; B32B 2307/7244; B32B 27/20
See application file for complete search history.

(56) References Cited

FOREIGN PATENT DOCUMENTS

| | | |
|---|---|---|
| JP | H08-52845 A | 2/1996 |
| JP | 2000-263711 A | 9/2000 |
| JP | 2003-292771 A | 10/2003 |
| JP | 2011-178140 A | 9/2011 |
| JP | 2014-034647 A | 2/2014 |
| WO | 2011/068105 A1 | 6/2011 |
| WO | 2012/042679 A1 | 4/2012 |

OTHER PUBLICATIONS

International Search Report issued in corresponding International Patent Application No. PCT/JP2020/035896 dated Dec. 1, 2020.

*Primary Examiner* — Lawrence D Ferguson
(74) *Attorney, Agent, or Firm* — Morgan, Lewis & Bockius LLP

(57) ABSTRACT

The present disclosure provides a laminate having a gas barrier layer and a polyurethane layer.

12 Claims, No Drawings

LAMINATE

TECHNICAL FIELD

The present invention relates to a laminate.

DISCUSSION OF THE BACKGROUND

Films obtained by using a resin having gas barrier properties such as an ethylene-vinyl alcohol copolymer find a wide range of applications such as packaging materials for foods, medical treatment, and the like. Recently, for the purpose of improving various types of performance such as the gas barrier properties, a variety of laminates have been proposed in which a plurality of resin layers, each having a thickness of micron order or submicron order, are laminated.

As a conventional laminate in which a plurality of resin layers of the ethylene-vinyl alcohol copolymer are laminated, for example, Patent Document 1 discloses a multilayer structure having a total of 8 or more layers of: a layer consisting of a resin composition containing a gas barrier resin such as an ethylene-vinyl alcohol copolymer or the like, and a layer consisting of a thermoplastic resin such as thermoplastic polyethylene. Patent Document 1 discloses that due to one of adjacent resin layers containing a metal salt, providing a multilayer structure being superior in terms of interlayer adhesiveness is enabled.

PRIOR ART DOCUMENTS

Patent Documents

Patent Document 1: PCT International Publication No. 2011/068105

SUMMARY OF THE INVENTION

Problems to be Solved by the Invention

A laminate having 8 or more layers such as that disclosed in Patent Document 1 is superior in terms of gas barrier properties after flexion, but it has been found that there is further scope to improve recyclability since, in a case in which melt forming is carried out to recycle off-spec products, trim, and the like of the laminate, for example, a hue of the resin deteriorates, the resin deteriorated adheres to a screw in the melt molder, and/or the like.

The present invention was made in view of the foregoing circumstances, and an object of the present invention is to provide a laminate which is superior in terms of recyclability while favorably maintaining interlayer adhesive force, external appearance, and the gas barrier properties after flexion.

Means for Solving the Problems

According to the present invention, the object is achieved by providing the following.
[1] A laminate including: a gas barrier layer (A) which contains an ethylene-vinyl alcohol copolymer (a); and a polyurethane layer (B) which contains a thermoplastic polyurethane (b), wherein
the laminate has a constitution including at least one set of the gas barrier layer (A) and the polyurethane layer (B) being directly laminated, a sum of numbers of the gas barrier layer (A) and the polyurethane layer (B) is 9 or more and 300 or less, and the gas barrier layer (A) contains 10 ppm or more and 300 ppm or less, in terms of metal atoms, of a higher fatty acid metal salt (c) having 10 or more carbon atoms.
[2] The laminate according to [1], wherein a metal atom constituting the higher fatty acid metal salt (c) includes at least one selected from the group consisting of magnesium and cobalt.
[3] The laminate according to [2], wherein the higher fatty acid metal salt (c) includes at least one selected from the group consisting of magnesium stearate and cobalt stearate.
[4] The laminate according to any one of [1] to [3], wherein a content of an ethylene unit of the ethylene-vinyl alcohol copolymer (a) is 20 mol % or more and 60 mol % or less.
[5] The laminate according to any one of [1] to [4], wherein the gas barrier (A) and the polyurethane layer (B) are alternately laminated.
[6] The laminate according to [5], wherein the polyurethane layer (B) includes: a polyurethane layer (B1) on which the gas barrier layer (A) is directly laminated on both faces; and a polyurethane layer (B2) on which the gas barrier layer (A) is directly laminated on only one face.
[7] The laminate according to [6], including a protective layer (D) being directly laminated on the polyurethane layer (B2), wherein the protective layer (D) contains a thermoplastic polyurethane (x).
[8] The laminate according to [7], wherein the protective layer (D) contains an ethylene-vinyl alcohol copolymer (y).
[9] The laminate according to [7] or [8], wherein an average thickness per layer of the protective layer (D) is 300 μm or more and 800 μm or less.
[10] The laminate according to any one of [1] to [9], wherein an outermost layer is the polyurethane layer (B).
[11] The laminate according to any one of [1] to [10], wherein an average thickness per layer of the gas barrier (A) is 0.1 μm or more and 10 μm or less.
[12] The laminate according to any one of [1] to [11], wherein an average thickness per layer of the polyurethane layer (B) is 0.1 μm or more and 30 μm or less.
[13] The laminate according to any one of [1] to [12], wherein a ratio (gas barrier (A)/polyurethane layer (B)) of the average thickness per layer of the gas barrier (A) to the average thickness per layer of the polyurethane layer (B) is 0.1 or more and 1 or less.

Effects of the Invention

According to the present invention, a laminate which is superior in terms of recyclability while favorably maintaining interlayer adhesive force, external appearance, and the gas barrier properties after flexion, as well as a product including the laminate, can be provided.

DESCRIPTION OF EMBODIMENTS

Laminate

The laminate of the present invention includes: a gas barrier layer (A) (hereinafter, may be abbreviated as "A layer") which contains an ethylene-vinyl alcohol copolymer (a) (hereinafter, may be abbreviated as "EVOH (a)"); and a polyurethane layer (B) (hereinafter, may be abbreviated as "B layer") which contains a thermoplastic polyurethane (b) (hereinafter, may be abbreviated as "TPU (b)"), wherein the laminate has a constitution including at least one set of the A layer and the B layer being directly laminated, a sum of numbers of the gas barrier layer (A) and the polyurethane layer (B) is 9 or more and 300 or less, and the A layer contains 10 ppm or more and 300 ppm or less, in terms of metal atoms, of a higher fatty acid metal salt (c) (hereinafter, may be abbreviated as the "higher fatty acid metal salt (c)") having 10 or more carbon atoms. Due to the laminate having a laminate structure in which the constitution includes at least one set of the A layer and the B layer being directly laminated and the higher fatty acid metal salt (c) is included in the predetermined amount, while maintaining superiority in terms of the gas barrier properties and flex resistance obtained due to the multilayer structure, in a case of carrying out melt forming to recycle trim and/or the like, suppressing deterioration of the hue of the resin and deteriorated resin adhering to a screw in the melt molder is enabled. It is to be noted that the "gas barrier properties" as referred to herein can be evaluated based on a measurement value of an oxygen transmission rate, and specifically can be evaluated in accordance with a method described in the Examples. Furthermore, the term "ppm" as referred to herein means a percentage content on a mass basis.

The laminate of the present invention may be constituted from only the A layer and the B layer, or may have an other resin layer aside from the A layer and the B layer. Furthermore, in light of inhibiting deterioration of mechanical properties in carrying out melt molding to recycle the trim and/or the like, the laminate is preferably constituted from only the A layer and the B layer, but in the case in which the laminate includes the other resin layer, the other resin layer is preferably the outermost layer.

The laminate of the present invention has the constitution including at least one set of the A layer and the B layer being directly laminated, a constitution including at least four sets of the A layer and the B layer being directly laminated is preferable, and it is preferable that all layers of the A layer and the B layer constituting the laminate are directly laminated on either the A layer or the B layer. When the laminate has the above-described constitution of direct lamination, there is a tendency for deterioration of the gas barrier properties upon flexion to be inhibited. Furthermore, at the time of carrying out melt molding to recycle the trim and/or the like, in light of the higher fatty acid metal salt (c) included in the A layer (EVOH) efficiently migrating to the B layer (polyurethane) and exhibiting more favorable recyclability, the A layer and the B layer being alternately laminated is preferable.

In light of enabling efficiently conducting coextrusion, the laminate of the present invention preferably has a symmetrical structure (for example, B layer/A layer/B layer/A layer/B layer/A layer/B layer/A layer/B layer).

In the case in which the A layer and the B layer are alternately laminated, in light of further inhibiting deterioration of the gas barrier properties upon causing flexion, the B layer preferably includes: the polyurethane layer (B1) (hereinafter, may be abbreviated as "B1 layer") on which the A layer is directly laminated on both faces; and the polyurethane layer (B2) (hereinafter, may be also referred to as "B2 layer") on which the gas barrier layer (A) is directly laminated on only one face. In other words, it is preferable that at least one of the outermost layers in the part in which the A layer and the B layer are alternately laminated is the B layer. The B layer as the at least one of the outermost layers in the part in which the A layer and the B layer are alternately laminated is the B2 layer, and the other B layer is the B1 layer. Furthermore, the B layer more preferably includes two of the B2 layer. In other words, it is further preferable that both of the outermost layers in the part in which the A layer and the B layer are alternately laminated are the B layer.

In the case of including the B2 layer, in light of further inhibiting deterioration of the gas barrier properties upon causing flexion, the laminate of the present invention preferably includes the protective layer (D) (hereinafter, may be abbreviated as "D layer") being directly laminated on the B2 layer. The protective layer (D) is a layer which contains the thermoplastic polyurethane (x) (hereinafter, may be abbreviated as "TPU (x)"), and preferably contains the ethylene-vinyl alcohol copolymer (y) (hereinafter, may be abbreviated as "EVOH (y)"). The layer structure of the laminate including the D layer is exemplified by D layer/B2 layer/A layer/B1 layer/A layer/B1 layer/A layer/B1 layer/A layer/B2 layer/D layer. The D layer is preferably the outermost layer. The D layer may be provided on only one face side, but is preferably provided on both face sides. The laminate of the present invention may be a structure consisting of only the A layer and the B layer, a structure consisting of only the A layer, the B layer, and the D layer, or a structure further having another resin layer.

The number of the A layer constituting the laminate of the present invention is preferably 4 or more, more preferably 6 or more, and still more preferably 8 or more. The number of the A layer is 4 or more is preferable due to further inhibiting deterioration of the gas barrier properties upon causing flexion. On the other hand, the number of the A layer may be 150 or less.

The number of the B layer constituting the laminate of the present invention is preferably 4 or more, more preferably 6 or more, and still more preferably 7 or more. The number of the B layer being 4 or more is preferable due to further inhibiting deterioration of the gas barrier properties during flexion. On the other hand, the number of the B layer may be 150 or less.

The sum of the numbers of the A layer and the B layer constituting the laminate of the present invention is typically 9 or more, preferably 11 or more, still more preferably 15 or more, further preferably 25 or more, and particularly preferably 30 or more. On the other hand, the sum of the numbers of the A layer and the B layer is typically 300 or less, preferably 200 or less, and still more preferably 100 or less. Furthermore, the total number of layers in the laminate preferably falls within the above range. When the laminate is such a multilayer structure, even if a defect such as a pinhole or a crack with respect to flexion or the like occurs in a certain layer of the A layer, the gas barrier properties can be maintained with the other A layer(s), and as a result, enhancing characteristics such as the gas barrier properties, durability, and the like of the laminate as a whole is enabled.

Furthermore, in the case of carrying out melt kneading for recycling, problems such as the hue of the resin deteriorating, deteriorated resin adhering to a screw in the melt molder, and the like are unique problems which significantly occur in the case of the conventional laminate, which has many layers. With regard to this, it is considered that since in the case of carrying out melt kneading on the laminate which has many layers, the EVOH (a) and the TPU (b) are finely dispersed and mixed together, and there is a tendency for a transesterification reaction and the like to occur excessively, whereby, e.g., deterioration of the hue of the resin and the like due to such a reaction is promoted. By, e.g., including the higher fatty acid metal salt (c) in the predetermined amount in the A layer in a laminate in which the sum of the numbers of the A layer and the B layer is 9 or more, a benefit in which the recyclability is superior while the laminate is multilayered in this way can be enjoyed. Furthermore, in the present invention, due to containing the higher fatty acid metal salt (c) in the A layer in the predetermined amount, contrary to the conventional laminate, there is a tendency for the recyclability to be favorable due to making the laminate a multilayer structure. Although not necessarily clarified and without wishing to be bound by any theory, the reason for this is presumed to be, for example, that in carrying out melt kneading, the higher fatty acid metal salt (c) becomes more likely to be dispersed throughout the entire melt kneaded product, whereby it is considered the effects due to the higher fatty acid metal salt (c) are more likely to be achieved throughout the entirety.

An average thickness per layer of the A layer is preferably 0.1 μm or more, more preferably 0.2 μm or more, and still more preferably 0.3 μm or more. On the other hand, the average thickness per layer of the A layer is preferably 10 μm or less, more preferably 5 μm or less, still more preferably 3 μm or less, and particularly preferably 2 μm or less. When the average thickness per layer of the A layer is 0.1 μm or more, there is a tendency for forming the laminate with uniform thickness to be comparatively easy, and for the gas barrier properties, the durability thereof, and the like to be further improved. Conversely, when the average thickness per layer of the A layer is 10 μm or less, there is a tendency for flexibility and the like to improve, and as a result, for the durability and the like to improve. Furthermore, in the case in which the average thickness per layer of the A layer is 10 μm or less, there is a tendency for the recyclability to be further improved. This is presumed to be, for example, because in carrying out melt kneading to recycle the trim and/or the like, the higher fatty acid metal salt (c) included in the A layer can be uniformly dispersed throughout the entire melt kneaded product.

An average thickness per layer of the B layer is preferably 0.1 μm or more, more preferably 0.5 μm or more, still more preferably 1 μm or more, and particularly preferably 3 μm or more. On the other hand, the average thickness per layer of the B layer is preferably 30 μm or less, more preferably 15 μm or less, still more preferably 10 μm or less, and particularly preferably 8 μm or less. When the average thickness per layer of the B layer is 0.1 μm or more, there is a tendency for forming the laminate with uniform thickness to be comparatively easy, and for the durability to be further improved. Furthermore, it becomes easy for sufficient flexibility to be expressed. Conversely, when the average thickness per layer of the B layer is 30 μm or less, there is a tendency for the interlayer adhesiveness and the gas barrier properties to improve. Furthermore, in the case in which the average thickness per layer of the B layer is 30 μm or less, there is a tendency for the recyclability to be further improved. This is presumed to be, for example, because in carrying out melt kneading to recycle the trim and/or the like, the higher fatty acid metal salt (c) included in the A layer can be efficiently migrated to the entire polyurethane of the B layer.

An average thickness per layer of the B1 layer is preferably 0.1 μm or more, more preferably 0.5 μm or more, still more preferably 1 μm or more, and particularly preferably 3 μm or more. On the other hand, the average thickness per layer of the B1 layer is preferably 20 μm or less, more preferably 15 μm or less, still more preferably 10 μm or less, and particularly preferably 8 μm or less. When the average thickness per layer of the B1 layer is 0.1 μm or more, there is a tendency for forming the laminate with uniform thickness to be comparatively easy, and for the durability to be further improved. Furthermore, it becomes easy for sufficient flexibility to be expressed. Conversely, when the average thickness per layer of the B1 layer is 20 μm or less, there is a tendency for the interlayer adhesiveness and the gas barrier properties to improve. Furthermore, in the case in which the average thickness per layer of the B1 layer is 20 μm or less, there is a tendency for the recyclability to be further improved. This is presumed to be, for example, because in carrying out melt kneading to recycle the trim and/or the like, the higher fatty acid metal salt (c) included in the A layer can be efficiently migrated to the entire polyurethane of the B1 layer.

An average thickness per layer of the B2 layer is preferably 1 μm or more, more preferably 3 μm or more, and still more preferably 10 μm or more. On the other hand, the average thickness per layer of the B2 layer is preferably 30 μm or less, more preferably 25 μm or less, and still more preferably 20 μm or less. When the average thickness per layer of the B2 layer is 1 μm or more, there is a tendency for the durability to be further improved. Furthermore, it becomes easy for sufficient flexibility to be expressed. Conversely, when the average thickness per layer of the B2 layer is 30 μm or less, there is a tendency for the interlayer adhesiveness and the gas barrier properties to improve. Furthermore, in the case in which the average thickness per layer of the B2 layer is 30 μm or less, there is a tendency for the recyclability to be further improved. This is presumed to be, for example, because in carrying out melt kneading to recycle the trim and/or the like, the higher fatty acid metal salt (c) included in the A layer can be efficiently migrated to the entire polyurethane of the B2 layer.

In the case in which the laminate of the present invention includes the D layer, an average thickness per layer of the D layer is preferably 300 μm or more, more preferably 350 μm or more, and still more preferably 400 μm or more. On the other hand, the average thickness of the D layer is preferably 800 μm or less, more preferably 750 μm or less, and still more preferably 700 μm or less. When the average thickness of the D layer is 300 μm or more, there is a tendency for the durability to further improve. Furthermore, it becomes easy for sufficient flexibility to be expressed. Conversely, when the average thickness of the D layer is 800 μm or less, there is a tendency for the gas barrier properties after flexion to be improved.

A total thickness of all layers of the A layer and all layers of the B layer may, for example, be 5 μm or more, and is preferably 10 μm or more, more preferably 15 μm or more, and still more preferably 30 μm or more. On the other hand, the total thickness of all layers of the A layer and all layers of the B layer is preferably 500 μm or less, more preferably 300 μm or less, and still more preferably 100 μm or less. In the case in which the total thickness of all layers of the A layer and all layers of the B layer is 10 μm or more, there is a tendency for the flexural resistance, the durability, the gas barrier properties, and the like to improve. Conversely, in the case in which the total thickness is 500 μm or less, the flexibility, moldability, and the like can be improved, and deterioration of the flexural resistance, a rise in production cost, and the like can be inhibited. Herein, the "total thickness of all layers" means the sum of the average thicknesses of each layer. In the laminate of only the A layer and the B layer, the overall thickness of the laminate of the A layer and the B layer can be the total thickness. The average thickness per layer of each layer is an average value of thicknesses of cross-sections at 10 sites selected arbitrarily.

A ratio of the average thickness per layer of the A layer to the average thickness per layer of the B layer (gas barrier layer (A)/polyurethane layer (B)) is preferably 0.1 or more, more preferably 0.15 or more, and still more preferably 0.2 or more. Furthermore, the ratio is preferably 1 or less, more preferably 0.8 or less, and still more preferably 0.6 or less. When the ratio of the average thickness per layer of the A layer to the average thickness per layer of the B layer (A/B) is 0.1 or more, there is a tendency for deterioration of the gas barrier properties to be inhibited due to fractures of the A layer arising from stress during flexion being reduced. Furthermore, when the ratio (A/B) is 1 or less, there is a tendency for fractures of the A layer to be reduced due to stress during flexion being inhibited by the B layer, whereby deterioration of the gas barrier properties is inhibited. Moreover, in the case in which the ratio of the average thickness per layer of the A layer to the average thickness per layer of the B layer falls within the above range, there is a tendency for the content of the higher fatty acid metal salt (c) to be a suitable amount throughout the laminate as a whole, whereby recyclability is further improved.

The average thickness of the laminate of the present invention as a whole is not particularly limited, and a suitable average thickness can be adopted in accordance with an intended purpose, functionality, and the like. For example, when the thickness is comparatively thin, a reduction in weight and the like can be achieved, whereas when the thickness is comparatively thick, the gas barrier properties and the like can be further improved. The lower limit of the average thickness of the laminate of the present invention as a whole may be, for example, 5 µm, 10 µm, 15 µm, 30 µm, 100 µm, or 300 µm. On the other hand, the upper limit may be 3 mm, 1 mm, 500 µm, 300 µm, or 100 µm.

The interlayer adhesive force between the A layer and the B layer of the laminate of the present invention is preferably 300 g/15 mm or more, more preferably 500 g/15 mm or more, and still more preferably 700 g/15 mm or more. Furthermore, the interlayer adhesive force of the laminate of the present invention may be 1,500 g/15 mm or less. When the interlayer adhesive force is 300 g/15 mm or more, there is a tendency for interlayer delamination upon flexion to be inhibited. Means of improving the interlayer adhesive force of the laminate of the present invention may be exemplified by methods such as: increasing an addition amount of the higher fatty acid metal salt (c) within an appropriate range; directly laminating the A layer and the B layer; alternately laminating the A layer and the B layer; and the like. The interlayer adhesive force of the laminate of the present invention can be measured by a method disclosed in the Examples.

An oxygen transmission rate (OTR) of the laminate of the present invention measured at 20° C. and 65% RH is preferably 20 mL/(m$^2$·day·atm) or less, more preferably 15 mL/(m$^2$·day·atm) or less, and still more preferably 10 mL/(m$^2$·day atm) or less. Furthermore, the OTR may be 0.2 mL/(m2·day·atm) or more. When the oxygen transmission rate of the laminate of the present invention falls within the above range, the laminate can be suitably used as a material for which durability is required. Furthermore, the OTR after flexion, described in the Examples, of the laminate of the present invention is preferably 60 mL/(m$^2$·day·atm) or less, and more preferably 20 mL/(m$^2$·day·atm) or less. Moreover, the OTR after flexion may be 0.3 mL/(m$^2$·day·atm) or more. When the OTR after flexion of the laminate of the present invention falls within the above range, the laminate can be suitably used as a material for which elasticity is required. The OTR and the OTR after flexion of the laminate of the present invention may be measured by methods described in the Examples.

Despite being a multilayered laminate, the laminate of the present invention enables inhibiting coloring, even in a case of repeating melt kneading. Although not necessarily clarified and without wishing to be bound by any theory, the reason for this is presumed to be as follows: 1) heat stability is maintained by the higher fatty acid metal salt (c) due to the higher fatty acid not being readily volatile; and 2) an effect of suppressing coloring is increased due to the higher fatty acid metal salt (c) which can readily disperse throughout the entire resin at the time of melt kneading.

A Layer

The A layer is a layer containing the EVOH (a). Due to containing the EVOH (a), the A layer enables obtaining a laminate which is superior in terms of the gas barrier properties.

A content of the EVOH (a) in the A layer is preferably 60% by mass or more, more preferably 80% by mass or more, still more preferably 90% by mass or more, and particularly preferably 95% by mass or more, and as the resin constituting the A layer, the EVOH (a) may account for 100% by mass.

EVOH (a)

The EVOH (a) is a polymer having an ethylene unit and a vinyl alcohol unit as principal structural units. It is to be noted that the EVOH (a) may also include one type or a plurality of types of other structural units in addition to the ethylene unit and the vinyl alcohol unit. The EVOH (a) is typically obtained by polymerizing ethylene with a vinyl ester, and saponifying a thus resulting ethylene-vinyl ester copolymer.

An ethylene unit content (specifically, a ratio of the number of ethylene units to the total number of monomers in the EVOH (a)) of the EVOH (a) is preferably 20 mol % or more, more preferably 25 mol % or more, still more preferably 30 mol % or more, and particularly preferably 35 mol % or more. On the other hand, the ethylene unit content of the EVOH (a) is preferably 60 mol % or less, and more preferably 55 mol % or less. When the ethylene unit content of the EVOH (a) is 20 mol % or more, the gas barrier properties and the like of the laminate obtained under high humidity are further improved, and melt molding properties are also improved. Conversely, when the ethylene unit content of the EVOH (a) is 60 mol % or less, the gas barrier properties of the laminate obtained are further improved.

A degree of saponification (specifically, a proportion of the number of vinyl alcohol units to the total number of vinyl alcohol units and vinyl ester units in the EVOH (a)) of the EVOH (a) is preferably 80 mol % or more, more preferably 95 mol % or more, and particularly preferably 99 mol % or more. On the other hand, the degree of saponification of the EVOH (a) is preferably 99.99 mol % or less. When the degree of saponification of the EVOH (a) is 80 mol % or more, there is a tendency for the melt molding properties to improve, and in addition, there are also cases in which the gas barrier properties of the laminate improve, and resistance to coloring and moisture resistance also improve. Conversely, in the case in which the degree of saponification of the EVOH (a) is 99.99 mol % or less, sufficient gas barrier properties and the like can be exhibited while inhibiting an increase in production cost of the EVOH (a). The EVOH (a) may be used alone, but an embodiment involving use after blending with the EVOH (a) having the degree of saponification exceeding 99 mol % is also suitable.

The EVOH (a) preferably has at least one of a structural unit (I) represented by the following formula (I), a structural unit (II) represented by the following formula (II), and a structural unit (III) represented by the following formula (III). When the EVOH (a) has such a structural unit, the flexural resistance and the like of the laminate obtained can be further improved.

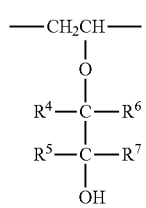
(I)

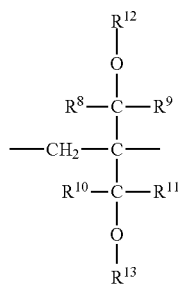
(II)

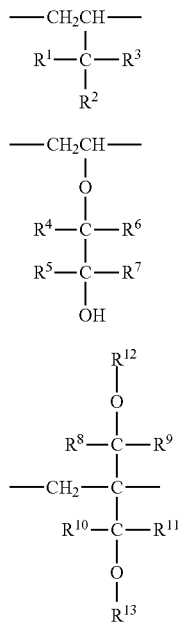
(III)

In the above formula (I), $R^1$, $R^2$, and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxyl group. Furthermore, a pair from $R^1$, $R^2$, and $R^3$ may be bonded. Moreover, a part or all of hydrogen atoms contained in the aliphatic hydrocarbon group having 1 to 10 carbon atoms, the alicyclic hydrocarbon group having 3 to 10 carbon atoms, and the aromatic hydrocarbon group having 6 to 10 carbon atoms may be substituted with a hydroxyl group, a carboxy group, or a halogen atom.

In the above formula (II), $R^4$, $R^5$, $R^6$, and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxyl group. Furthermore, $R^4$ and $R^5$, or $R^6$ and $R^7$ may be bonded. Moreover, a part or all of hydrogen atoms contained in the aliphatic hydrocarbon group having 1 to 10 carbon atoms, the alicyclic hydrocarbon group having 3 to 10 carbon atoms, and the aromatic hydrocarbon group having 6 to 10 carbon atoms may be substituted with a hydroxyl group, an alkoxy group, a carboxy group, or a halogen atom.

In the above formula (III), $R^8$, $R^9$, $R^{10}$, and $R^{11}$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxyl group. Moreover, a part or all of hydrogen atoms contained in the aliphatic hydrocarbon group having 1 to 10 carbon atoms, the alicyclic hydrocarbon group having 3 to 10 carbon atoms, and the aromatic hydrocarbon group having 6 to 10 carbon atoms may be substituted with a hydroxyl group, an alkoxy group, a carboxy group, or a halogen atom. $R^{12}$ and $R^{13}$ each independently represent a hydrogen atom, a formyl group, or an alkanoyl group having 2 to 10 carbon atoms.

A content of the structural unit (I), (II), or (III) with respect to total structural units is preferably 0.5 mol % or more, more preferably 1 mol % or more, and still more preferably 1.5 mol % or more. On the other hand, the content of the structural unit (I), (II), or (III) is preferably 30 mol % or less, more preferably 15 mol % or less, and still more preferably 10 mol % or less. When the EVOH (a) has the structural unit represented by the above formula (I), (II), or (III) in a proportion falling within the above range, the material which forms the A layer exhibits improved flexibility and improved processing characteristics, and consequently, the stretchability, thermoformability and the like of the laminate obtained can be improved.

In the structural unit (I), (II) or (III), the aliphatic hydrocarbon group having 1 to 10 carbon atoms is exemplified by an alkyl group, an alkenyl group, and the like, the alicyclic hydrocarbon group having 3 to 10 carbon atoms is exemplified by a cycloalkyl group, a cycloalkenyl group, and the like, and the aromatic hydrocarbon group having 6 to 10 carbon atoms is exemplified by a phenyl group and the like.

In the structural unit (I), it is preferred that $R^1$, $R^2$ and $R^3$ each independently represent a hydrogen atom, a methyl group, an ethyl group, a hydroxyl group, a hydroxymethyl group, or a hydroxyethyl group, and of these, it is more preferred that $R^1$, $R^2$ and $R^3$ each independently represent a hydrogen atom, a methyl group, a hydroxyl group, or a hydroxymethyl group. When $R^1$, $R^2$ and $R^3$ are as described above, the stretchability and thermoformability of the laminate can be further improved.

A method for allowing the EVOH (a) to include the structural unit (I) is not particularly limited. For example, a method may be employed in which a monomer from which the structural unit (I) is derived is copolymerized in the polymerization of ethylene with a vinyl ester. Examples of the monomer from which the structural unit (I) is derived include: alkenes such as propylene, butylene, pentene, and hexene; and alkenes having a hydroxyl group and/or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene, and 5,6-diacyloxy-1-hexene. Of these, propylene, 3-acetoxy-1-propene, 3-acetoxy-1-butene, 4-acetoxy-1-butene, and 3,4-diacetoxy-1-butene are preferred in light of reactivity in copolymerization and the gas barrier properties of the laminate obtained. In the case of the alkene having an ester group, the structural unit (I) is derived during the saponification reaction.

In the above structural unit (II), it is preferred that $R^4$ and $R^5$ both represent a hydrogen atom. In particular, it is more preferred that $R^4$ and $R^5$ both represent a hydrogen atom, one of $R^6$ and $R^7$ represents an aliphatic hydrocarbon group having 1 to 10 carbon atoms, and the other of $R^6$ and $R^7$ represents a hydrogen atom. The aliphatic hydrocarbon group is preferably an alkyl group or an alkenyl group. In light of particular importance of the gas barrier properties of the laminate obtained, it is particularly preferred that one of $R^6$ and $R^7$ represents a methyl group or an ethyl group, and the other of $R^6$ and $R^7$ represents a hydrogen atom. Alternatively, it is also particularly preferred that one of $R^6$ and $R^7$ represents a substituent represented by $(CH_2)_hOH$ (where h is an integer of 1 to 8), and the other of $R^6$ and $R^7$ represents a hydrogen atom. In the substituent represented by $(CH_2)_hOH$, h is preferably an integer of 1 to 4, more preferably 1 or 2, and particularly preferably 1.

The method for allowing the EVOH (a) to include the structural unit (II) is not particularly limited. For example, a method may be employed in which EVOH obtained by a saponification reaction is allowed to react with a monovalent epoxy compound such that the structural unit (II) is included in the EVOH. As the monovalent epoxy compound, a compound represented by one of the following formulae (IV) to (X) is suitably used.

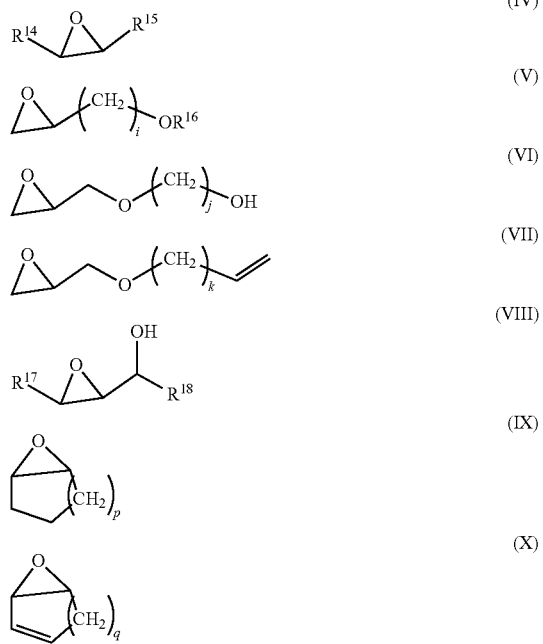

In the above formulae (IV) to (X), $R^{14}$, $R^{15}$, $R^{16}$, $R^{17}$ and $R^{18}$ each independently represent a hydrogen atom, an aliphatic hydrocarbon group (such as an alkyl group or an alkenyl group) having 1 to 10 carbon atoms, an alicyclic hydrocarbon group (such as a cycloalkyl group or a cycloalkenyl group) having 3 to 10 carbon atoms, or an aliphatic hydrocarbon group (such as a phenyl group) having 6 to 10 carbon atoms; and i, j, k, p, and q are each independently an integer of 1 to 8.

Examples of the monovalent epoxy compound represented by the above formula (IV) include epoxyethane (ethylene oxide), epoxypropane, 1,2-epoxybutane, 2,3-epoxybutane, 3-methyl-1,2-epoxybutane, 1,2-epoxypentane, 3-methyl-1,2-epoxypentane, 1,2-epoxyhexane, 2,3-epoxyhexane, 3,4-epoxyhexane, 3-methyl-1,2-epoxyhexane, 3-methyl-1,2-epoxyheptane, 4-methyl-1,2-epoxyheptane, 1,2-epoxyoctane, 2,3-epoxyoctane, 1,2-epoxynonane, 2,3-epoxynonane, 1,2-epoxydecane, 1,2-epoxydodecane, epoxyethylbenzene, 1-phenyl-1,2-epoxypropane, 3-phenyl-1,2-epoxypropane, and the like. Examples of the monovalent epoxy compound represented by the above formula (V) include various types of alkyl glycidyl ethers. Examples of the monovalent epoxy compound represented by the above formula (VI) include various types of alkylene glycol monoglycidyl ethers. Examples of the monovalent epoxy compound represented by the above formula (VII) include various types of alkenyl glycidyl ethers. Examples of the monovalent epoxy compound represented by the above formula (VIII) include various types of epoxyalkanols such as glycidol. Examples of the monovalent epoxy compound represented by the above formula (IX) include various types of epoxycycloalkanes. Examples of the monovalent epoxy compound represented by the above formula (X) include various types of epoxycycloalkenes.

Of the monovalent epoxy compounds described above, monovalent epoxy compounds having 2 to 8 carbon atoms are preferred. In particular, the monovalent epoxy compound more preferably has 2 to 6 atoms, and still more preferably has 2 to 4 carbon atoms, in light of ease in handling the compound and in light of reactivity. Of the monovalent epoxy compounds represented by the above formulae, the compound represented by the formula (IV) and the compound represented by the formula (V) are particularly preferred. Specifically, in light of reactivity with EVOH and the gas barrier properties of the laminate obtained, 1,2-epoxybutane, 2,3-epoxybutane, epoxypropane, epoxyethane, and glycidol are preferred, and of these, epoxypropane and glycidol are particularly preferred.

In the structural unit (III), $R^8$, $R^9$, $R^{10}$ and $R^{11}$ each preferably represent a hydrogen atom or an aliphatic hydrocarbon group having 1 to 5 carbon atoms. In particular, the aliphatic hydrocarbon group is preferably a methyl group, an ethyl group, an n-propyl group, an isopropyl group, an n-butyl group, an isobutyl group, a tert-butyl group, or a pentyl group.

The method for allowing the EVOH (a) to include the structural unit (III) is not particularly limited, and for example, the EVOH (a) including the structural unit (III) may be produced by using the method described in Japanese Unexamined Patent Application, Publication No. 2014-034647.

Higher Fatty Acid Metal Salt (c) Having 10 or More Carbon Atoms

The A layer contains 10 ppm or more and 300 ppm or less, in terms of metal atoms, of the higher fatty acid metal salt (c). As referred to herein, the "higher fatty acid" means a fatty acid having 10 or more carbon atoms. The A layer containing the higher fatty acid metal salt (c) in the predetermined amount is preferable since, in repeating melt molding for recycled use of the trim or the like of the laminate, inhibiting deterioration of the hue and reducing the amount adhered on the screw (screw adhesion amount) are enabled. Although not necessarily clarified and without wishing to be bound by any theory, the reason for achieving such effects due to the A layer containing the higher fatty acid metal salt (c) is presumed to be as in (1) and (2) below. (1) It is considered that due to containing the higher fatty acid metal salt (c) in the EVOH (a), the screw adhesion amount at a time of recovery can be reduced, whereas even in a case of containing the higher fatty acid metal salt (c) in only the TPU (b), there is a tendency for the reducing effect to not be efficiently enabled. (2) It is considered that to inhibit hue deterioration in repeating melt molding for recycled use of the trim and the like of the laminate, it is necessary for the higher fatty acid metal salt (c) to migrate from the EVOH (a) to the TPU (b). It is surmised that in a case in which a lower fatty acid metal salt is used in place of the higher fatty acid metal salt (c), migration of the lower fatty acid metal salt to the TPU (b) is insufficient, whereby a sufficient hue-improving effect cannot be obtained.

The metal atom constituting the higher fatty acid metal salt (c) may be a single type of metal, or may consist of a plurality of types of metal. With regard to the metal atom, a monovalent metal, a divalent metal, and the like may be exemplified, and in light of improving adhesiveness between the A layer and the B layer, the metal atom is preferably the divalent metal. The divalent metal is preferably at least one selected from the group consisting of magnesium, manganese, tin, cobalt, zinc, and titanium. Of these, the metal atom is preferably at least one selected from the group consisting of magnesium and cobalt. Due to containing the metal atom, there is a tendency for superior adhesiveness to be exhibited between the A layer and the B layer. Although not necessarily clarified and without wishing to be bound by any theory, with regard to the reason for the superior adhesiveness being exhibited, there is a tendency for the compound including the metal atom to promote a transesterification reaction, and it is considered that there is a possibility that the reaction contributes to the improvement in adhesiveness.

The lower limit of the number of carbon atoms in the higher fatty acid constituting the higher fatty acid metal salt (c) is preferably 12, more preferably 13, and still more preferably 14, 15, 16, 17, or 18. Furthermore, the upper limit of the number of carbon atoms is, for example, 30, and may be 24, may be 22, or may be 20. Examples of the higher fatty acid constituting the higher fatty acid metal salt (c) include stearic acid, ricinoleic acid, myristic acid, lauric acid, and the like, and of these, stearic acid is preferred. Including the higher fatty acid is preferable due to a tendency for deterioration of the hue to be inhibited in repeating melt molding for recycled usage of the trim and the like of the laminate.

As the higher fatty acid metal salt (c), for example, magnesium stearate, cobalt stearate, and the like can be suitably used.

A content of the higher fatty acid metal salt (c) in terms of metal atoms is typically 10 ppm or more, preferably 20 ppm or more, and more preferably 30 ppm or more. Furthermore, the content of the higher fatty acid metal salt (c) in terms of metal atoms is typically 300 ppm or less, preferably 200 ppm or less, and more preferably 100 ppm or less. When the content of the higher fatty acid metal salt (c) in terms of metal atoms is less than 10 ppm, there is a tendency for the hue to deteriorate and the amount adhered on the screw of the extruder to increase in repeating melt molding for recycled use of the trim and the like of the laminate. Furthermore, when the content of the higher fatty acid metal salt (c) is 10 ppm or more, interlayer adhesive force improves as well. When the content of the higher fatty acid metal salt (c) in terms of metal atoms is more than 300 ppm, there is a tendency for the hue to deteriorate in repeating melt molding for recycled use of the trim and the like of the laminate.

To the A layer may be added, within a range not leading to impairment of the effects of the present invention, one or a plurality of types of additives such as a phosphoric acid compound, a carboxylic acid compound, a boron compound, a metal salt other than the higher fatty acid metal salt (c), and the like. When these additives are added to the EVOH (a) or the like constituting the A layer, various types of performance, such as long-run workability in a case of long-time film formation of the laminate of the present invention, resistance to coloring in melt molding, film-forming stability, adhesiveness between the A layer and the B layer, deterioration inhibition of the EVOH at the time of repeated recycling of the laminate, external appearance of a molded product, and the like can be improved.

Examples of the phosphoric acid compound which may be used include various acids such as phosphoric acid and phosphorous acid and salts thereof. A phosphate may be contained, for example, in any form of a primary phosphate, a secondary phosphate, or a tertiary phosphate. A cation species of the phosphate is not particularly limited, either, and an alkali metal ion or an alkaline earth metal ion is preferred. Of these, addition of the phosphoric acid compound such as sodium dihydrogenphosphate, potassium dihydrogenphosphate, disodium hydrogenphosphate, or dipotassium hydrogenphosphate is preferred. In the case in which the A layer contains the phosphoric acid compound, a content thereof in terms of phosphate radical equivalent is preferably 1 to 500 ppm. When the A layer contains the phosphoric acid compound, there is a tendency for the long-run workability to improve in the case of long-time film formation of the A layer.

The carboxylic acid compound which may be contained in the A layer is exemplified by a carboxylic acid, as well as an carboxylic acid ion, or may be a carboxylic acid derivative. Furthermore, the carboxylic acid may be a monocarboxylic acid, a polyvalent carboxylic acid having two or more carboxy groups within its molecule, or a combination thereof. It is to be noted that the polyvalent carboxylic acid is preferably not a polymer. Furthermore, the polyvalent carboxylic acid ion is derived from the polyvalent carboxylic acid by eliminating at least one hydrogen ion of the carboxy group. The carboxy group of the carboxylic acid may be esterified, or the carboxylic acid ion may form a salt with a metal. The carboxylic acid compound preferably has 10 carbon atoms or fewer.

The monocarboxylic acid is not particularly limited, and examples thereof include formic acid, acetic acid, propionic acid, butyric acid, caproic acid, capric acid, acrylic acid, methacrylic acid, benzoic acid, 2-naphthoic acid, and the like. These carboxylic acids may have a hydroxyl group and/or a halogen atom. In addition, the carboxylic acid ion is exemplified by those derived from each of the carboxylic acids by eliminating a hydrogen ion of its carboxyl group. The pKa of the monocarboxylic acid (also including the monocarboxylic acid that gives the monocarboxylic acid ion) is, in light of adjustability of the pH of the composition and melt formability, preferably 3.5 or greater, and more preferably 4 or greater. Examples of such a monocarboxylic acid include formic acid (pKa=3.68), acetic acid (pKa=4.74), propionic acid (pKa=4.85), butyric acid (pKa=4.80), and the like. In light of easy handling and the like, acetic acid is preferred.

Moreover, the multivalent carboxylic acid is not particularly limited as long as two or more carboxyl groups are included within its molecule, and examples thereof include: aliphatic dicarboxylic acids such as oxalic acid, malonic acid, succinic acid, maleic acid, fumaric acid, glutaric acid, adipic acid, and pimelic acid; aromatic dicarboxylic acids such as phthalic acid, isophthalic acid, and terephthalic acid; tricarboxylic acids such as aconitic acid; carboxylic acid having 4 or more carboxyl groups such as 1,2,3,4-butanetetracarboxylic acid and ethylenediaminetetraacetic acid; hydroxycarboxylic acids such as tartaric acid, citric acid, isocitric acid, malic acid, mucic acid, tartronic acid, and citramalic acid; ketocarboxylic acids such as oxaloacetic acid, mesoxalic acid, 2-ketoglutaric acid, and 3-ketoglutaric acid; amino acids such as glutamic acid, aspartic acid, and 2-aminoadipic acid; and the like. It is to be noted that examples of the multivalent carboxylic acid ion include anions of these multivalent carboxylic acids. Of these, succinic acid, malic acid, tartaric acid, and citric acid are particularly preferred in light of favorable availability.

In the case in which the A layer contains the carboxylic acid compound, in light of coloring resistance in melt molding, a content thereof in terms of carboxylic acid radical equivalent is preferably 0.5 mmol/g to 20 wag.

Examples of the boron compound include boric acids, boric acid esters, boric acid salts, hydrogenated borons, and the like. Specific examples of the boric acids include orthoboric acid (hereinafter, merely referred to also as "boric acid"), metaboric acid, tetraboric acid, and the like. Specific examples of the boric acid esters include triethyl borate, trimethyl borate, and the like. Specific examples of the boric acid salts include alkali metal salts, alkaline earth metal salts of the aforementioned various types of boric acids, borax, and the like. Of these compounds, orthoboric acid is preferred.

In the case in which the A layer contains the boron compound, in light of favorable film-forming stability of the A layer, a content thereof is preferably 20 to 2,000 ppm in terms of boron element equivalent.

The metal salt other than the higher fatty acid metal salt (c) is exemplified by a lower fatty acid metal salt having fewer than 10 carbon atoms, a metal salt of an organic acid other than a fatty acid, a metal salt of an inorganic acid, and the like. A metal used in the metal salt is preferably an alkali metal or an alkaline earth metal. Examples of the alkali metal include lithium, sodium, potassium, and the like. The alkali metal salt is exemplified by lower aliphatic carboxylates, aromatic carboxylates, phosphates, metal complexes, and the like of alkali metals. Examples of the alkali metal salt include sodium acetate, potassium acetate, sodium phosphate, potassium phosphate, a sodium salt of ethylenediamine tetraacetic acid, and the like. Of these, sodium acetate, potassium acetate, sodium phosphate, and potassium phosphate are suitable. In the case in which the A layer contains the alkaline earth metal salt other than the higher fatty acid metal salt (c), in light of improving the interlayer adhesiveness, a content thereof is preferably 20 to 1,000 ppm in terms of metal atoms. Examples of the alkaline earth metal include beryllium, magnesium, calcium, strontium, barium, and the like, and in light of industrial availability, magnesium or calcium is more preferred. The alkaline earth metal salt is exemplified by lower aliphatic carboxylates, aromatic carboxylates, phosphates, metal complexes, and the like of alkali earth metals. Examples of the alkaline earth metal salt include magnesium acetate, calcium acetate, magnesium phosphate, calcium phosphate, and the like, and of these, magnesium acetate and calcium acetate are suitable. In the case in which the A layer contains the alkali earth metal salt other than the higher fatty acid metal salt (c), a content thereof is preferably 20 to 1,000 ppm in terms of metal atoms. When the alkali earth metal salt is included in the above range, there is a tendency for more superior adhesiveness between the A layer and the B layer to be exhibited. Furthermore, deterioration of the EVOH in repeatedly recycling the laminate is inhibited, and the external appearance of the molded product is improved due to a reduction in defects such as gels and hard spots.

The A layer may contain an other resin in addition to the EVOH (a) within a range not leading to impairment of the effects of the present invention. Examples of the other resin include polyethylene, polypropylene, an ethylene-propylene copolymer, an ethylene or propylene copolymer (a copolymer of ethylene or propylene, and at least one of the following monomers: an α-olefin such as 1-butene, isobutene, 4-methyl-1-pentene, 1-hexene, and 1-octene; vinylpyrrolidone; etc.), polyolefins such as poly 4-methyl-1-pentene and poly 1-butene; polyesters such as polyethylene terephthalate, polybutylene terephthalate, and polyethylene naphthalate; vinylidene polychloride, vinyl polychloride, polystyrene, polycarbonate, and polyacrylate; and the like.

Furthermore, the A layer may contain, in addition to the other resin, a variety of components such as a heat stabilizer, an ultraviolet ray absorbing agent, an antioxidant, a colorant, a filler, a plasticizer, a photoinitiator, a deodorant, an antistatic agent, a lubricant, a desiccant, a filling agent, a pigment, a dye, a processing aid, a flame retardant, an anti-fogging agent, and the like.

B Layer

The B layer is a polyurethane layer containing the TPU (b). Due to having the B layer containing the TPU (b), the laminate of the present invention enables achieving favorable stretchability, flexural resistance, heat formability, and the like.

A content of the TPU (b) in the B layer is preferably 60% by mass or more, more preferably 80% by mass or more, still more preferably 90% by mass or more, and particularly preferably 95% by mass or more, and as the resin constituting the B layer, the TPU (b) may account for 100%.

The B layer containing the TPU (b) is preferable due to enabling improving the stretchability, the heat moldability, and the like. Furthermore, owing to, for example, the strong adhesiveness between the B layer and the A layer, the laminate of the present invention is capable of exhibiting favorable flex resistance and the like.

The TPU (b) is constituted from a high-molecular weight polyol, an organic polyisocyanate, a chain extender, and the like. The TPU (b) is typically, for example, a linear multiblock copolymer that includes: (1) a hard segment obtained by a reaction of a short chain glycol (low-molecular weight polyol) with an isocyanate, and (2) a soft segment obtained by a reaction of a long chain glycol (high-molecular weight polyol) with an isocyanate.

The high-molecular weight polyol is a substance having a plurality of hydroxyl groups, and may be obtained by polycondensation, addition polymerization (e.g., ring-opening polymerization), polyaddition, or the like. The high-molecular weight polyol is exemplified by a polyester polyol, a polyether polyol, a polycarbonate polyol, condensates thereof (e.g., a polyester-ether-polyol), and the like. The high-molecular weight polyol may be used either alone, or as a mixture of two or more types thereof. Of these, a polyester polyol and a polycarbonate polyol are preferred, and a polyester polyol is particularly preferred.

The polyester polyol may be produced, for example, according to a conventional method, by allowing an ester-formable derivative such as a dicarboxylic acid, an ester thereof, or an anhydride thereof to be condensed with a low-molecular weight polyol by way of a direct esterification reaction or a transesterification reaction, or by subjecting a lactone to ring-opening polymerization.

Examples of the polyether polyol include polyethylene glycol, polypropylene glycol, polytetramethylene glycol, poly(methyltetramethylene) glycol, and the like. The polyether polyol may be used either alone, or as a mixture of two or more types thereof. Of these, polytetramethylene glycol is preferred.

As the polycarbonate polyol, for example, a substance obtained through condensation polymerization by allowing an aliphatic diol having 2 to 12 carbon atoms such as 1,4-butanediol, 1,5-pentanediol, 1,6-hexanediol, 1,8-octanediol, or 1,10-decanediol, or a mixture of these to react with diphenyl carbonate, phosgene, or the like may be suitably used.

The lower limit of the number average molecular weight of the high-molecular weight polyol is preferably 500, more preferably 600, and still more preferably 700. The upper limit of the number average molecular weight of the high-molecular weight polyol is preferably 8,000, more preferably 5,000, and still more preferably 3,000. When the number average molecular weight of the high-molecular weight polyol is equal to or greater than the lower limit, resilience of TPU resulting from appropriate miscibility with the organic polyisocyanate improves, whereby there is a tendency for mechanical characteristics such as stretchability and thermoformability of the laminate obtained to improve. Conversely, when the number average molecular weight of the high-molecular weight polyol is equal to or less than the upper limit, miscibility with the organic polyisocyanate improves, whereby mixing in the polymerization procedure becomes easier. As a result, it may be easier to obtain stable TPU due to inhibiting generation of blocks of gelatinous matter, and the like. It is to be noted that the number average molecular weight of the high-molecular weight polyol is determined by a measurement in accordance with JIS K 1577 and calculated based on the hydroxyl value.

The organic polyisocyanate is not particularly limited, and a well-known organic diisocyanate commonly employed in the production of TPU may be used. Examples of the organic diisocyanate include: aromatic diisocyanates such as 4,4'-diphenylmethanediisocyanate, tolylenediisocyanate, phenylenediisocyanate, xylylenediisocyanate, 1,5-naphthylenediisocyanate, 3,3'-dichloro-4,4'-diphenylmethanediisocyanate, and toluylenediisocyanate; aliphatic diisocyanates (inclusive of alicyclic diisocyanates) such as hexamethylenediisocyanate, isophoronediisocyanate, 4,4'-dicyclohexylmethanediisocyanate, and hydrogenated xylylenediisocyanate; and the like. Among these, 4,4'-diphenylmethanediisocyanate is preferred in light of the advantage that the strength and flex resistance of the laminate obtained can be improved. The organic diisocyanate may be used either alone, or in a combination of two or more types thereof.

As the chain extender, any chain extender commonly employed in the production of TPU may be used, and a low-molecular weight compound having two or more active hydrogen atoms that can react with an isocyanate group in the molecule and having a molecular weight of 300 or less is suitably used. Examples of the chain extender include ethylene glycol, propylene glycol, 1,4-butanediol, 1,6-hexanediol, 1,4-bis(β-hydroxyethoxy)benzene, 1,4-cyclohexanediol, and the like. Among these, an aliphatic diol having 2 to 10 carbon atoms is preferred, and 1,4-butanediol is particularly preferred, in light of the advantage that the stretchability and thermoformability of the laminate obtained can be more favorable. The chain extender may be used either alone, or as a mixture of two or more types thereof.

As for the method for producing the TPU (b), the high-molecular weight polyol, the organic polyisocyanate, and the chain extender described above are used and a well-known urethanating reaction technique is employed. Either the prepolymer method or the one-shot method may be used for the production. Specifically, melt polymerization conducted substantially in the absence of a solvent is preferred, and continuous melt polymerization conducted through the use of a multi-screw extruder is particularly preferred.

The B layer may be constituted from only the TPU (b), or may contain another resin aside from the TPU (b). Furthermore, the B layer may further contain another component such as a heat stabilizer, an ultraviolet ray absorbing agent, an antioxidant, a colorant, a filler, and the like. It is to be noted that suitable modes of the B1 layer and the B2 layer are similar to the suitable mode of the B layer, except for the average thickness.

D Layer

The D layer is a layer which is directly laminated on the B2 layer and contains the TPU (x). When the laminate of the present invention includes the D layer, there is a tendency for the durability and the flexibility to be improved, whereby the gas barrier properties after flexion can be favorably maintained. Suitable modes of the TPU (x) are similar to the suitable modes of the TPU (b), being the component of the B layer, except for the content. The content of the TPU (x) in the D layer is preferably 70% by mass or more, and more preferably 80% by mass or more. Furthermore, the content of the TPU (x) in the D layer may be 100% by mass or less, and is preferably 99% by mass or less, and more preferably 98% by mass or less.

The D layer preferably contains the EVOH (y). When the D layer contains the EVOH (y), there is a tendency to enable favorably maintaining the gas barrier properties after flexion. Suitable modes of the EVOH (y) are similar to the suitable modes of the EVOH (a), being the component of the A layer, except for the content. The content of the EVOH (y) in the D layer is preferably 1% by mass or more and 30% by mass or less, and more preferably 2% by mass or more and 20% by mass or less.

In light of a reduction in cost, the D layer is preferably a layer which uses recovered substances from trim, off-spec products, and the like of the laminate of the present invention.

A method of using the recovered product of the trim, the off-spec product, or the like of the laminate of the present invention is exemplified by: a method of pulverizing the trim and/or off-spec product and then inserting the pulverized matter into an extruder and conducting film forming; and a method of carrying out melt kneading using an extruder to produce pellets, and then inserting the pellets back into the extruder to form a film. To control the thickness of the D layer or to dilute the D layer with a novel TPU, a method of carrying out melt kneading to produce pellets, and then inserting the pellets back into the extruder is preferred.

With regard to the D layer formed using the recovered product of the trim, off-spec product, and/or the like of the laminate of the present invention, the EVOH (y) has a tendency to be dispersed favorably in the matrix phase of the TPU (x), whereby there is a tendency for the laminate of the present invention to be superior in flexural resistance. The reason for achieving such favorable dispersibility is presumed to be as in the following. First, due to the laminate of the present invention being a multi-layered structure, the EVOH (a) of the A layer and the TPU (b) of the B layer physically mix together easily, accompanying the melt kneading. On the other hand, in the case of being a multi-layered structure and the EVOH (a) and the TPU (b) physically mixing together easily at the time of the melt kneading, a transesterification reaction may proceed, exerting an unfavorable effect on the dispersibility. However, in the case of the laminate of the present invention, the proceeding of the transesterification reaction is appropriately controlled by the higher fatty acid metal salt (c). It is considered that as a result, the dispersibility of the EVOH (y) is improved by the D layer formed using the recovered product of the laminate of the present invention. Thus, the higher fatty acid metal salt (z) is preferably further included in the D layer.

A content ratio x/y of the TPU (x) to the EVOH (y) in the D layer is preferably 70/30 or more, more preferably 75/25 or more, and still more preferably 80/20 or more. On the other hand, the content ratio x/y is preferably 100/0 or less, more preferably 99/1 or less, and still more preferably 98/2 or less. When the content ratio x/y falls within the above range, there is a tendency for sufficient flexibility to be expressed, whereby the gas barrier properties after flexion can be favorably maintained.

A proportion of the D layer accounted for by a total amount of the TPU (x) and the EVOH (y) constituting the D layer is preferably 80% by mass or more, more preferably 85% by mass or more, and still more preferably 90% by mass or more. When the proportion of the D layer accounted for by the total amount of the TPU (x) and the EVOH (y) constituting the D layer is 80% by mass or more, the gas barrier properties after flexion can be maintained, and it becomes easy for sufficient flexibility to be expressed. The proportion of the D layer accounted for by the total amount of the TPU (x) and the EVOH (y) constituting the D layer may be 99% by mass or more.

In a case in which the D layer contains the EVOH (y) and the TPU (x), the TPU (x) and the EVOH (y) in a phase-separated structure of the D layer need only be mixed together, but it is preferable that the D layer has a sea-island structure in which a principal component of the sea phase is the TPU (x), and a principal component of the island phases (dispersed phases) is the EVOH (y). Herein, the "principal component" means that a proportion accounted for in the phase is over 50% by mass. The proportion of the TPU (x) and the EVOH (y) accounting for each layer is preferably 75% by mass or more, more preferably 90% by mass or more, and still more preferably 95% by mass or more. When the D layer has such a phase-separated structure, the flexural resistance of the D layer can be further improved.

In the case in which the D layer has the sea-island structure and the principal component of the island phases is the EVOH (y), the lower limit of an average dispersed particle diameter thereof is preferably 0.05 μm. When the average dispersed particle diameter is 0.05 μm or more, there is a tendency for the recyclability to improve without carrying out excessive kneading. On the other hand, the upper limit of the average dispersed particle diameter is preferably 1 μm. When the average dispersed particle diameter is 1 μm or less, there is a tendency for the flexural resistance of the D layer to be favorable. Herein, the average dispersed particle diameter as referred to means a particle diameter calculated by averaging the sizes of 10 particles of the EVOH (y) in order from the largest particle, of those having a particle diameter of 9 μm×13 μm upon electron microscopic observation of an arbitrary cross section of the D layer. In a case in which the particles of the EVOH (y) have a shape other than a round shape, such as an ovular shape, a value of a minor axis is used for the calculation. When the average dispersed particle diameter falls within the above range, there is a tendency for favorable flexural resistance to be expressed.

The average dispersed particle diameter can be adjusted in accordance with a mass ratio of the EVOH (y) and the TPU (x), a content of the higher fatty acid metal salt (z), kneading conditions in forming the D layer, and the like. A suitable range of the mass ratio of the EVOH (y) and the TPU (x) is as described above. Furthermore, when the content of the higher fatty acid metal salt (z) in the D layer is 0.1 ppm or more and 50 ppm or less in terms of metal atoms, there is a tendency for the EVOH (y) to be favorably dispersed in the matrix phase of the TPU (x). In the case of the D layer being formed using the recovered product of the laminate of the present invention, the reason for the tendency for the flexural resistance to be favorable is believed to be that there is a tendency for the mass ratio of the EVOH (y) and the TPU (x), and the content of the higher fatty acid metal salt (z) to fall within the above ranges. Furthermore, methods of adjusting the kneading conditions may be exemplified by the following methods. For example, in a case of using a single screw extruder, a method in which a resin residence time period and/or shear viscosity is/are adjusted by a screw shape or a groove depth may be exemplified. With regard to the screw shape, a full-flight screw or a barrier screw can be used, but to adjust the kneading strength, a screw having a shape such as Maddock or Dulmage may be used. Furthermore, to increase a shearing speed, a screw rotation speed may be adjusted. Moreover, in light of enabling easily changing the shape of the screw, there may be a case of using a double screw extruder. In the case of using the double screw extruder, to adjust the kneading strength, a method of adjusting a length of a kneading disc or the like may be exemplified.

In the case of using the double screw extruder, in terms of specific kneading conditions, for example, the lower limit of the shearing speed r in a metering unit of a melt extruder, calculated from the following general formula (1), is preferably 10 sec$^{-1}$, more preferably 15 sec$^{-1}$, and particularly preferably 20 sec$^{-1}$. Furthermore, the upper limit of the shearing speed r is preferably 100 sec$^{-1}$, more preferably 95 sec$^{-1}$, and particularly preferably 90 sec$^{-1}$. When kneading is carried out at the lower limit or above, the EVOH (a) in the A layer and the TPU (b) in the B layer in the laminate of the present invention are appropriately mixed together, whereby there is a tendency to enable adjusting the average dispersed particle diameter to the appropriate range, and as a result, the flexural resistance is favorable. On the other hand, if kneading is carried out at or above the upper limit, there may be a case of the EVOH (a) and the TPU (b) being mixed together excessively, whereby the average dispersed particle diameter may become smaller and the heat stability may worsen.

$$r = \frac{\pi \cdot DN}{60 \cdot h} \qquad (1)$$

In the above general formula (1), D represents a cylinder diameter (cm), N represents a screw rotation speed (rpm), h represents a groove depth of the measuring unit (cm), and r represents the shearing speed (sec$^{-1}$).

Intended Usage, Etc.

Due to being superior in terms of interlayer adhesive force, external appearance, the gas barrier properties after flexion, and the like, the laminate of the present invention can be used as a food packaging material, a container packaging material for medical treatment, other container packaging materials, a sheet material for industrial use, etc., and as a sheet material for architectural use, a sheet material for agriculture, a geomembrane, a radon barrier film, other sheet materials, as well as various other types of pipes, and the like. In particular, the laminate of the present invention can be suitably used as an inner liner for a tire, an air cushion material for a shoe sole, an inner package of an accumulator, an inflatable ball, an air spring, or the like, as well as a gas barrier film laminated on a filmy rubber product, etc.

Method for Producing Laminate

A method for producing the laminate of the present invention is not particularly limited as long as the A layer and the B layer can be favorably laminated and adhere to each other, and a well-known method such as coextrusion, pasting, coating, bonding, or attaching may be employed.

The laminate of the present invention may be produced by a method preferably including a step of coextending the resin for forming the A layer and the resin for forming the B layer. According to such a method, the productivity is superior, superior interlayer adhesive force between the A layer and the B layer is obtained, and the recyclability is also superior.

According to a multilayer coextrusion process, the laminate of the present invention is formed by a process including: heating to melt the resin for forming the A layer and the resin for forming the B layer; feeding the resins with different extruders and/or pumps to extrusion dies through their respective flow paths; extruding the polymers into multiple layers, from the extrusion dies; and thereafter laminating by adhesion. As the extrusion die, for example, a multimanifold die, a field block, a static mixer, or the like may be used.

It is to be noted that the melt viscosity ratio is preferably as specified below in relation to the viscosity of each of the resins for forming the A layer and the B layer. The lower limit of the ratio ($\eta_B/\eta_A$) of the viscosity of the polymer for forming the B layer ($\eta_B$) to the viscosity of the polymer for forming the A layer ($\eta_A$) at a temperature of 210° C. and at a share rate of 1,000/sec is preferably 0.3, and more preferably 0.5. On the other hand, the upper limit of the melt viscosity ratio ($\eta_B/\eta_A$) is preferably 2, and more preferably 1.5. When the melt viscosity ratio ($\eta_B/\eta_A$) falls with the above range, a favorable external appearance may be provided in forming the laminate of the present invention by multilayer coextrusion, and favorable adhesion between the A layer and the B layer may be provided, whereby the durability and the like of the laminate of the present invention can be improved.

Also in the case of including layer(s) aside from the A layer and the B layer, such as the D layer, the laminate of the present invention may be produced in accordance with the method described above. In other words, each layer may be adhered by a well-known method such as coextrusion, pasting, coating, bonding, or attaching, and of these, producing by coextrusion is preferred.

The method for producing the laminate of the present invention preferably includes a step of irradiating with an electron beam, the structure (laminate) obtained after the coextrusion. Due to the irradiation with an electron beam, a crosslinking reaction occurs between layers, and thus the interlayer adhesive force of the laminate obtained can be enhanced. Various types of electron beam accelerators such as a Cockcroft-Walton accelerator, a Van de Graaff accelerator, a resonance transformer accelerator, an insulated core transformer accelerator, a Dynamitron accelerator, and a high frequency accelerator may be used as an electron beam source.

EXAMPLES

Hereinafter, the present invention is explained in detail by way of Examples, but the present invention is not in any way limited to these Examples.

Materials Used

EVOH-1: "EVAL (registered trademark) E105B" (available from Kuraray Co. Ltd.; ethylene-vinyl alcohol copolymer; ethylene unit content: 44 mol %)

EVOH-2: "EVAL (registered trademark) F101B" (available from Kuraray Co. Ltd.; ethylene-vinyl alcohol copolymer; ethylene unit content: 32 mol %)

EVOH-3: "EVAL (registered trademark) L171B" (available from Kuraray Co. Ltd.; ethylene-vinyl alcohol copolymer; ethylene unit content: 27 mol %)

EVOH-4: "EVAL (registered trademark) G156B" (available from Kuraray Co. Ltd.; ethylene-vinyl alcohol copolymer; ethylene unit content: 48 mol %)

TPU-1: "Estane (registered trademark) 2103-90AE" (available from Lubrizol Corporation; thermoplastic polyurethane)

Evaluation Methods (1) Interlayer Adhesive Force Between a Layer and B Layer

The laminates obtained from the Examples and Comparative Examples were stored in an atmosphere of 23° C. and 50% RH, and then the day after production, a 15 mm strip-shaped slice was made and used as a test material for measurement. Using the test material for measurement, a T type peel strength was measured by using "AGS-H model," an autograph available from Shimadzu Corporation, in an atmosphere of 23° C. and 50% RH, at a strain rate of 250 mm/min. The obtained value (units: g/15 mm) was defined as the interlayer adhesive force between the A layer and the B layer, and the laminate was evaluated on the interlayer adhesiveness based on the following evaluation criteria.

Evaluation: Criteria

A: 700 g/15 mm or more
B: Less than 700 g/15 mm and 500 g/15 mm or more
C: Less than 500 g/15 mm and 300 g/15 mm or more
D: Less than 300 g/15 mm (2) External Appearance The laminates obtained from the Examples and the Comparative Examples were visually evaluated on the external appearance based on the following evaluation criteria.

Evaluation: Criteria

A: Favorable appearance with no stripes or streaks
B: Stripes are slightly visible with respect to flowing direction of film
C: Stripes are visible with respect to flowing direction of film
D: Stripes and streaks are visible with respect to flowing direction of film (3) Gas Barrier Properties after Flexion (Flexural Resistance)

With regard to the laminates obtained in the Examples and the Comparative Examples, flexion was repeated 50 times in an environment at 23° C. using "BE1006," a thermostat-attached Gelvo-type flex tester manufactured by Tester Sangyo Co., Ltd., in accordance with ASTM-F392-74. The laminates before and after flexing were evaluated on the gas barrier properties as shown below. Specifically, the laminates obtained in the Examples and the Comparative examples were subjected to humidity conditioning at 20° C. and 65% RH for 5 days, and the oxygen permeation rate was measured with "MOCON OX-TRAN2/20 model" (Modern Controls Inc.) under a condition at 20° C. and 65% RH, in accordance with the method prescribed in ITS K 7126-2 (equal pressure method; 2006), and the average value was determined (unit: mL/(m2·day·atm)). It is to be noted that the oxygen permeation rate being 300 mL/(m2·day·atm) or less suggests the amount of oxygen permeation corresponding to 300 mL or less per m$^2$ per day under a condition of 1 atmospheric pressure; therefore, the evaluation may be made as having the gas barrier properties. The oxygen permeation rate before subjecting to flexion was defined as OTR0 and the oxygen permeation rate after flexion was defined as OTR50, and OTR0/OTR50 was evaluated in accordance with the following evaluation criteria.
Evaluation: Criteria
  A: OTR0/OTR50≥0.9
  B: 0.9>OTR0/OTR50≥0.8
  C: 0.8>OTR0/OTR50≥0.7
  D: 0.7>OTR0/OTR50

(4) Recycling Test (Coloring)
60 g of the laminate obtained from each of the Examples and Comparative Examples was cut (about 1 cm×1 cm) to conform to an input port of a Laboplast Mill ("20R200," twin screw counter rotating type, manufactured by Toyo Seiki Seisaku-sho, Ltd.), and kneaded at 60 rpm at 200° C. for 30 min to produce a disc-shaped sample having a thickness of 2 mm. A state of coloring of the disc-shaped sample thus obtained was visually confirmed, and was evaluated as described below.
Evaluation: Criteria
  A: Almost no coloring
  B: Slight coloring
  C: Colored (faint yellow)
  D: Colored (yellow)

(5) Recycling Test (Screw Adhesion Amount)
60 g of the laminate obtained from each of the Examples and Comparative Examples was cut (about 1 cm×1 cm) to conform to an input port of a Laboplast Mill ("20R200," twin screw counter rotating type, manufactured by Toyo Seiki Seisaku-sho, Ltd.), and kneaded at 60 rpm at 200° C. for 30 min, and a thus kneaded resin was extracted. Thereafter, 60 g of "Novatec LJ400" (low density polyethylene (LDPE) available from Japan Polyethylene Corp.) was kneaded into the Laboplast Mill at 200° C. for 30 min, and the LDPE was extracted. Thereafter, a burnt product adhered to the screw was extracted, and a weight thereof was measured. The laminate was evaluated on the screw adhesion amount in accordance with the following evaluation criteria.
Evaluation: Criteria
  A: 0.5 g>screw adhesion amount
  B: 2.5 g>screw adhesion amount≥0.5 g
  B: 5.0 g>screw adhesion amount≥2.5 g
  D: Screw adhesion amount≥5.0 g (6) Recycling Test (Average Dispersed Particle Diameter)
2 kg of the laminate obtained from each of the Examples and Comparative Examples was cut (about 1 cm×1 cm) to conform to an input port of "D2020," a 20 mm extender manufactured by Toyo Seiki Seisaku-sho, Ltd. (D (mm)=20, L/D=20, compression ratio=2.0, screw: full flight), and then a strand was extruded under the following conditions, cooled by air cooling, and then pellets of a recovered product of the laminate were produced using a pelletizer.
  Pellet Production Conditions
    Extrusion temperature: supply unit: 180° C.
      compression unit: 210° C.
      metering unit: 210° C.
      die: 210° C.
    Screw rotation speed: 40 rpm
    Discharge rate: 1.3 kg/hr
    Number of die holes: 2 holes The pellets of the recovered product thus obtained were subjected to single-layer film forming using "D2020," the 20 mm extender manufactured by Toyo Seiki Seisaku-sho, Ltd. (D (mm)=20, L/D=20, compression ratio=2.0, screw: full flight) to obtain a single-layer film.
  Film Forming Conditions
    Extrusion temperature: supply unit: 180° C.
      compression unit: 210° C.
      metering unit: 210° C.
      die: 210° C.
    Screw rotation speed: 40 rpm
    Discharge rate: 1.3 kg/hr
    Temperature of drawing roll: 80° C.
    Speed of roll drawing: 1.0 m/min
    Film thickness: 60 μm The single-layer film thus obtained was cut with a microtome in a TD direction to produce a slice for cross-sectional observation. The slice thus produced was secured to a sample pedestal with carbon tape, and platinum ion sputtering was carried out for 30 sec at an accelerating voltage of 30 kV. The cross section of the single-layer film was observed with a field-emission transmission electron microscope (device: "SU8000," manufactured by Hitachi High-Technologies Corporation), and the average dispersed particle diameter was calculated. The measurement conditions involved an accelerating voltage of 1 kV, and a magnification of 20,000 times. Of particles of the EVOH (y) having a particle diameter that fell within 9 μm×13 μm in terms of a region observed with the electron microscope, an average of the sizes of 10 particles in order from the largest particle was calculated as the average dispersed particle diameter, and an evaluation was carried out in accordance with the following evaluation criteria.
Evaluation: Criteria
  A: 0.5 μm>average particle diameter≥0.05 μm
  B: 1.0 μm>average particle diameter≥0.5 μm
  C: 1.5 μm>average particle diameter 1.0 μm
  D: Average particle diameter≥1.5 μm (7) Recycling Test (Flexural Resistance)
The single-layer film produced in the evaluation method of (6) Recycling Test (Average Dispersed Particle Diameter) was cut to A4 size (TD 210 mm×MD 297 mm), and flexion was repeated 1,000 times in an environment at 23° C. using a Gelvo-type flex tester manufactured by Tester Sangyo Co., Ltd. in accordance with ASTM-F392-74. The number of pin holes after flexing was measured. It is to be noted that the single-layer film was evaluated on the number of pin holes in the A4 (210 mm×297 mm) range in accordance with the following evaluation criteria.
Evaluation: Criteria
  A: Number of pin holes≤1
  B: 2≤number of pin holes≤5
  C: 6≤number of pin holes≤10
  D: 11≤number of pin holes Example 1

To EVAL (registered trademark) E105B (EVOH-1) was dry blended magnesium stearate, available from FUJIFILM Wako Pure Chemical Corporation, so as to be 70 ppm in terms of Mg equivalent, and melt pelletization was performed at a screw rotation speed of 100 rpm and a discharge rate of 6.5 kg/hr using a two-screw extruder manufactured by Toyo Seiki Seisaku-sho, Ltd. (inlet diameter 25 mm, L/D=25) to produce a metal salt-containing EVOH. The metal salt-containing EVOH thus obtained and Estane 2103-90AE (TPU-1) were used as materials, which were fed in a molten state at 190° C. into a coextruder having a 19-layer feedblock and coextruded, whereby a laminate was produced having a total of 19 layers, with 9 layers of the EVOH layer and 10 layers of the TPU layer being alternately laminated.

The laminate obtained as described above was observed in cross section with "DIGITAL MICROSCOPE VK-X200," manufactured by Keyence Corporation. As a result, the A layer (EVOH layer) had an average thickness per layer of 1.1 μm; and the B layer (TPU layer) had an average thickness per layer of 3.3 μm. It is to be noted that each thickness was an averaged value of measurements at 10 points being randomly selected.

The laminate thus obtained was evaluated in accordance with (1) to (7) above. The evaluation results are shown in Table 1. It is to be noted that in the laminate thus obtained, the interlayer adhesive force was 890 g/15 mm; the external appearance was favorable, without stripes or streaks; the OTR before flexion (OTR0) was 3.0 mL/m²·day·atm, and the OTR after flexion (OTR50) was 3.2 mL/m²·day·atm; OTR0/OTR50 was 0.94; in the coloring test during recycling, there was almost no coloring; the screw adhesion amount during recycling was 0.2 g; the average dispersed particle diameter of the EVOH in the recycling test was 0.38 μm; and in the flexural resistance test, there were 0 pin holes.

Example 2 to Example 24, and Comparative Examples 1 to 6

Laminates were produced and evaluated by an operation similar to that of Example 1, except that the type of EVOH, the type(s) of metal salt, the added amount(s) of metal salt, the number of the A layer, the average thickness per layer of the A layer, the type of TPU, the amount of metal salt added to the B layer, the number of the B layer, and the average thickness per layer of the B layer were changed as shown in Tables 1 to 3. The evaluation results are shown in Tables 1 to 3.

TABLE 1

| | | | Example 1 | Example 2 | Example 3 | Example 4 | Example 5 | Example 6 |
|---|---|---|---|---|---|---|---|---|
| A layer | EVOH (a) | | EVOH-1 | EVOH-1 | EVOH-1 | EVOH-1 | EVOH-1 | EVOH-1 |
| | higher fatty acid metal salt (c) | metal salt | StMg | StMg | StMg | StMg | StMg | StMg |
| | | no. of carbon atoms | 18 | 18 | 18 | 18 | 18 | 18 |
| | | ppm | 70 | 197 | 295 | 34 | 22 | 13 |
| | no. of layers | | 9 | 9 | 9 | 9 | 9 | 9 |
| | average thickness (μm) | | 1.1 | 1.1 | 1.1 | 1.1 | 1.1 | 1.1 |
| B layer | TPU (b) | | TPU-1 | TPU-1 | TPU-1 | TPU-1 | TPU-1 | TPU-1 |
| | higher fatty acid metal salt (c) | metal salt | — | — | — | — | — | — |
| | | no. of carbon atoms | — | — | — | — | — | — |
| | | ppm | — | — | — | — | — | — |
| | no. of layers | | 10 | 10 | 10 | 10 | 10 | 10 |
| | average thickness (μm) | | 3.3 | 3.3 | 3.3 | 3.3 | 3.3 | 3.3 |
| Thickness ratio | A/B | | 0.3 | 0.3 | 0.3 | 0.3 | 0.3 | 0.3 |
| Interlayer adhesive force | | | A | A | A | A | B | B |
| External appearance | | | A | B | C | A | A | A |
| Gas barrier properties after flexion | | | A | A | A | A | A | A |
| Recycling test | coloring | | A | B | C | A | B | C |
| | screw adhesion amount | | A | A | B | A | B | C |
| | particle diameter | | A | B | C | A | B | C |
| | flexural resistance | | A | B | C | A | B | C |

| | | | Example 7 | Comparative Example 1 | Comparative Example 2 | Comparative Example 3 | Comparative Example 4 |
|---|---|---|---|---|---|---|---|
| A layer | EVOH (a) | | EVOH-1 | EVOH-1 | EVOH-1 | EVOH-1 | EVOH-1 |
| | higher fatty acid metal salt (c) | metal salt | StMg | StMg | — | AcOMg | StMg |
| | | no. of carbon atoms | 18 | 18 | — | 2 | 18 |
| | | ppm | 22 | 325 | — | 22 | 7 |
| | no. of layers | | 9 | 9 | 9 | 9 | 9 |
| | average thickness (μm) | | 1.1 | 1.1 | 1.1 | 1.1 | 1.1 |
| B layer | TPU (b) | | TPU-1 | TPU-1 | TPU-1 | TPU-1 | TPU-1 |
| | higher fatty acid metal salt (c) | metal salt | StMg | — | StMg | — | — |
| | | no. of carbon atoms | 18 | — | 18 | — | — |
| | | ppm | 32 | — | 32 | — | — |
| | no. of layers | | 10 | 10 | 10 | 10 | 10 |

TABLE 1-continued

|  |  | | | | | |
|---|---|---|---|---|---|---|
|  | average thickness (μm) | 3.3 | 3.3 | 3.3 | 3.3 | 3.3 |
|  | Thickness ratio A/B | 0.3 | 0.3 | 0.3 | 0.3 | 0.3 |
|  | Interlayer adhesive force | A | B | C | B | C |
|  | External appearance | A | D | A | A | A |
|  | Gas barrier properties after flexion | A | A | A | A | A |
|  | Recycling test coloring | A | D | B | D | D |
|  | screw adhesion amount | B | C | D | D | D |
|  | particle diameter | A | A | D | C | D |
|  | flexural resistance | A | A | D | C | D |

StMg: magnesium stearate;
AcOMg: magnesium acetate

TABLE 2

| | | | Example 8 | Example 9 | Example 10 | Example 11 | Example 12 | Example 13 | Example 14 |
|---|---|---|---|---|---|---|---|---|---|
| A layer | EVOH (a) | | EVOH-1 | EVOH-1 | EVOH-1 | EVOH-1 | EVOH-2 | EVOH-3 | EVOH-4 |
| | higher fatty acid metal salt (c) | metal salt | magnesium bis-ricinoleate | magnesium myristate | magnesium dilaurate | cobalt stearate | StMg | StMg | StMg |
| | | no. of carbon atoms | 18 | 13 | 12 | 18 | 18 | 18 | 18 |
| | | ppm | 70 | 70 | 70 | 70 | 70 | 70 | 70 |
| | no. of layers | | 9 | 9 | 9 | 9 | 9 | 9 | 9 |
| | average thickness (μm) | | 1.1 | 1.1 | 1.1 | 1.1 | 1.1 | 1.1 | 1.1 |
| B layer | TPU (b) | | TPU-1 | TPU-1 | TPU-1 | TPU-1 | TPU-1 | TPU-1 | TPU-1 |
| | higher fatty acid metal salt (c) | metal salt | — | — | — | — | — | — | — |
| | | no. of carbon atoms | — | — | — | — | — | — | — |
| | | ppm | — | — | — | — | — | — | — |
| | no. of layers | | 10 | 10 | 10 | 10 | 10 | 10 | 10 |
| | average thickness (μm) | | 3.3 | 3.3 | 3.3 | 3.3 | 3.3 | 3.3 | 3.3 |
| Thickness ratio A/B | | | 0.3 | 0.3 | 0.3 | 0.3 | 0.3 | 0.3 | 0.3 |
| Interlayer adhesive force | | | A | A | A | A | A | A | A |
| External appearance | | | A | A | A | A | A | A | A |
| Gas barrier properties after flexion | | | A | A | A | A | B | C | A |
| Recycling test | coloring | | B | B | C | B | A | A | A |
| | screw adhesion amount | | B | B | C | A | A | A | A |
| | particle diameter | | B | B | C | B | A | A | A |
| | flexural resistance | | B | B | C | B | A | A | A |

StMg: magnesium stearate

TABLE 3

| | | | Example 15 | Example 16 | Example 17 | Example 18 | Example 19 | Example 20 |
|---|---|---|---|---|---|---|---|---|
| A layer | EVOH (a) | | EVOH-1 | EVOH-1 | EVOH-1 | EVOH-1 | EVOH-1 | EVOH-1 |
| | higher fatty acid metal salt (c) | metal salt | StMg | StMg | StMg | StMg | StMg | StMg |
| | | no. of carbon atoms | 18 | 18 | 18 | 18 | 18 | 18 |
| | | ppm | 22 | 22 | 22 | 22 | 22 | 22 |
| | no. of layers | | 9 | 9 | 9 | 9 | 9 | 9 |
| | average thickness (μm) | | 1.1 | 2.8 | 5.3 | 3.2 | 4.1 | 0.6 |
| B layer | TPU (b) | | TPU-1 | TPU-1 | TPU-1 | TPU-1 | TPU-1 | TPU-1 |
| | higher fatty acid metal salt (c) | metal salt | — | — | — | — | — | — |
| | | no. of carbon | | | | | | |

TABLE 3-continued

|  |  |  |  |  |  |  |  |
|---|---|---|---|---|---|---|---|
|  | atoms ppm | — | — | — | — | — | — |
|  | no. of layers | 9 | 9 | 9 | 9 | 9 | 9 |
|  | average thickness (μm) | 5.2 | 8.2 | 11.2 | 2.9 | 9.2 | 3.1 |
| Thickness ratio | A/B | 0.2 | 0.3 | 0.47 | 1.10 | 0.4 | 0.2 |
| Interlayer adhesive force |  | B | B | B | B | B | B |
| External appearance |  | A | A | A | A | A | A |
| Gas barrier properties after flexion |  | A | B | B | C | B | B |
| Recycling test | coloring | B | C | C | C | C | B |
|  | screw adhesion amount | B | B | C | C | B | B |
|  | particle diameter | B | B | C | C | C | A |
|  | flexural resistance | B | B | C | C | C | A |

|  |  |  | Example 21 | Example 22 | Example 23 | Example 24 | Example 25 | Example 26 |
|---|---|---|---|---|---|---|---|---|
| A layer | EVOH (a) |  | EVOH-1 | EVOH-1 | EVOH-1 | EVOH-1 | EVOH-1 | EVOH-1 |
|  | higher fatty acid metal salt (c) | metal salt | StMg | StMg | StMg | StMg | StMg | AcOMg |
|  |  | no. of carbon atoms | 18 | 18 | 18 | 18 | 18 | 2 |
|  |  | ppm | 22 | 22 | 70 | 70 | 70 | 70 |
|  | no. of layers |  | 9 | 9 | 18 | 36 | 1 | 1 |
|  | average thickness (μm) |  | 0.3 | 0.3 | 1.1 | 1.1 | 4.1 | 4.1 |
| B layer | TPU (b) |  | TPU-1 | TPU-1 | TPU-1 | TPU-1 | TPU-1 | TPU-1 |
|  | higher fatty acid metal salt (c) | metal salt | — | — | — | — | — | — |
|  |  | no. of carbon atoms | — | — | — | — | — | — |
|  |  | ppm | — | — | — | — | — | — |
|  | no. of layers |  | 9 | 9 | 19 | 37 | 2 | 2 |
|  | average thickness (μm) |  | 3.4 | 0.6 | 3.3 | 3.3 | 9.2 | 9.2 |
| Thickness ratio | A/B |  | 0.1 | 0.50 | 0.3 | 0.3 | 0.4 | 0.4 |
| Interlayer adhesive force |  |  | B | B | A | A | A | B |
| External appearance |  |  | A | A | A | A | A | A |
| Gas barrier properties after flexion |  |  | C | C | A | A | D | D |
| Recycling test | coloring |  | B | B | A | A | B | C |
|  | screw adhesion amount |  | B | B | A | A | B | C |
|  | particle diameter |  | A | C | A | A | D | D |
|  | flexural resistance |  | A | C | A | A | D | D |

StMg: magnesium stearate;
AcOMg: magnesium acetate

In Example 1, due to the amount of the higher fatty acid metal salt (c) in terms of metal atoms, the metal salt, and the metal, as well as alternately laminating the gas barrier layer (A) and the polyurethane layer (B), the numbers of layers and the thicknesses thereof, and to appropriately adjusting the ratio (gas barrier layer (A)/polyurethane layer (B)) of the average thickness per layer of the gas barrier layer (A) to the average thickness per layer of the polyurethane layer (B), obtaining the laminate being superior in recyclability while favorably maintaining the interlayer adhesive force, external appearance, and the gas barrier layer after flexion of the laminate was enabled. In Examples 2 to 7, due to adjusting the amount of the higher fatty acid metal salt (c) in terms of metal atoms, while being somewhat inferior to Example 1, obtaining laminates being superior in terms of the interlayer adhesive force and the external appearance of the laminate, and recyclability was enabled. From these results, it can be understood that in a case in which the content of the higher fatty acid metal salt (c) is excessive or insufficient, there is a tendency for the recyclability, the external appearance, or the adhesiveness to deteriorate. In Examples 8 to 11, due to adjusting the higher fatty acid type and metal type of the higher fatty acid metal salt (c), while being somewhat inferior to Example 1, obtaining a laminate being superior in recyclability was enabled. From these results, it can be understood that when the number of carbon atoms of the higher fatty acid constituting the higher fatty acid metal salt (c) becomes lower, the recyclability deteriorates. In Examples 12 to 14, due to adjusting the ethylene unit content of the ethylene-vinyl alcohol copolymer (a), while being equivalent or somewhat inferior to Example 1, a laminate in which the gas barrier properties after flexion were favorable was obtained. From these results, it can be understood that the ethylene unit content being lower results in a tendency for the gas barrier properties after flexion to deteriorate. In Examples 15 to 24, due to adjusting the average thickness per layer of the gas barrier layer (A), the average thickness per layer of the polyurethane layer (B), and the ratio (gas barrier layer (A)/polyurethane layer (B)) of the average thickness per layer of the gas barrier layer (A) and the average thickness per layer of the polyurethane layer (B), while being somewhat inferior to Example 1, obtaining a laminate being superior in the interlayer adhesive force of the laminate, the gas barrier properties after flexion, and the recyclability was enabled. From these results, it can be understood that the film thicknesses of each layer, the number of layers, and the ratio of film thicknesses has an effect on the interlayer adhesive force, the gas barrier properties after flexion, and the recyclability. On the other hand, in the cases in which the types and amounts of the metal salts included in the gas barrier layer (A) are inappropriate, as in Comparative Examples 1 to 4, there is a tendency for the interlayer adhesive force, the recyclability, and/or the like to deteriorate.

Furthermore, comparing Comparative Example 3 (19 layers) and Comparative Example 6 (3 layers), which both contain AcOMg in the A layer and which differ only in the number of layers, while Comparative Example 3 was evaluated to be D in both coloring and the screw adhesion amount in the recycling test, Comparative Example 6 was evaluated to be C in both of these. In other words, it can be understood that deterioration of the hue of the resin and adhesion of the deteriorated resin to the screw in the melt molder in the case of carrying out melt kneading for recycling are phenomena which occur significantly when the number of layers is high. Furthermore, comparing Example 1 (19 layers) and Comparative Example 5 (3 layers), which both contain StMg in the A layer and which differ only in the number of layers, while Example 1 was evaluated to be A in both coloring and the screw adhesion amount in the recycling test, Comparative Example 5 was evaluated to be B in both of these. In other words, there was a result in which, in the case in which a higher fatty acid metal salt is included in the A layer in a predetermined amount, in contrast to the case of a lower fatty acid metal salt, the recyclability improves when a multilayer structure is adopted.

Example 25

The laminate was produced by a similar operation to that of Example 1, except for adjustments such that an average thickness of a layer corresponding to the polyurethane layer (B1) was 3.3 μm, and an average thickness of a layer corresponding to the polyurethane layer (B2) was 20 μm. The interlayer adhesive force of the laminate thus obtained was 850 g/15 mm; the external appearance was favorable, without stripes or streaks; the OTR before flexion (OTR0) was 3.0 mL/m² day atm, and the OTR after flexion (OTR50) was 3.1 mL/m²·day·atm; OTR0/OTR50 was 0.97; in the coloring test during recycling, there was almost no coloring; the screw adhesion amount during recycling was 0.1 g; the average dispersed particle diameter of the EVOH in the recycling test was 0.41 μm; and in the flexural resistance test, there were 0 pin holes. Similar to Example 1, obtaining the laminate being superior in recyclability while favorably maintaining the interlayer adhesive force, external appearance, and the gas barrier properties after flexion of the laminate was enabled.

Example 26

To EVAL (registered trademark) E105B (EVOH-1) was dry blended magnesium stearate, available from FUJIFILM Wako Pure Chemical Corporation, so as to be 70 ppm in terms of Mg equivalent, and melt pelletization was performed at a screw rotation speed of 100 rpm and a discharge rate of 6.5 kg/hr using a two-screw extruder made by Toyo Seiki Seisaku-sho, Ltd. (inlet diameter 25 mm, L/D=25) to produce a metal salt-containing EVOH. A laminate was produced and evaluated similarly to Example 25, except that as the protective layer (D) being directly laminated on the outer side of the polyurethane layer (B2) of Example 25, two layers of the protective layer (D) were provided by coextrusion using a resin composition having TPU-1: metal salt-containing EVOH in a ratio of 95:5, and a laminate having a sum of 21 layers was produced. The average thickness per layer of the protective layer (D) was 500 μm. The interlayer adhesive force of the laminate thus obtained was 930 g/15 mm; the external appearance was favorable, without stripes or streaks; the OTR before flexion (OTR0) was 3.0 mL/m² day atm, and the OTR after flexion (OTR50) was 3.1 mL/m² day atm; OTR0/OTR50 was 0.97; in the coloring test during recycling, there was almost no coloring; the screw adhesion amount during recycling was 0.06 g; the average dispersed particle diameter of the EVOH in the recycling test was 0.40 μm; and in the flexural resistance test, there were 0 pin holes. Obtaining the laminate being superior in recyclability while favorably maintaining the interlayer adhesive force, external appearance, and the gas barrier properties after flexion of the laminate was enabled.

Example 27

The laminate obtained in Example 1 was cut (about 1 cm×1 cm) to conform to an input port of "D2020," a 20 mm extruder available from Toyo Seiki Seisaku-sho, Ltd. (D (mm)=20, L/D=20, compression ratio=2.0, screw: full flight), which was then inserted into the extruder together with TPU-1 pellets such that a ratio of the resin in the recovered pellets thus obtained was TPU-1:EVOH-1=95:5, and then a strand was extruded under the following conditions, cooled by air cooling, and then pellets were produced using a pelletizer.

Pellet Production Conditions
Extrusion temperature: supply unit: 180° C.
  compression unit: 210° C.
  metering unit: 210° C.
  die: 210° C.
Screw rotation speed: 40 rpm
Discharge rate: 1.3 kg/hr
Number of die holes: 2

A laminate was produced and evaluated similarly to Example 26, except that as the protective layer (D) being directly laminated on the outer side of the polyurethane layer (B2) of Example 26, the pellets obtained as described above were used. The average thickness per layer of the protective layer (D) was 500 μm. The interlayer adhesive force of the laminate thus obtained was 920 g/15 mm; the external appearance was favorable, without stripes or streaks; the OTR before flexion (OTR0) was 3.0 mL/m²·day·atm, and the OTR after flexion (OTR50) was 3.2 mL/m²·day·atm; OTR0/OTR50 was 0.94; in the coloring test during recycling, there was almost no coloring; the screw adhesion amount during recycling was 0.2 g; the average dispersed particle diameter of the EVOH in the recycling test was 0.38 μm; and in the flexural resistance test, there was 1 pin hole. Obtaining the laminate being superior in recyclability while favorably maintaining the interlayer adhesive force, external appearance, and the gas barrier properties after flexion of the laminate was enabled.

The laminate obtained in Example 27 was cut with a microtome in a TD direction to produce a slice for cross-sectional observation. The slice thus produced was secured to a sample pedestal with carbon tape, and platinum ion sputtering was carried out for 30 sec at an accelerating voltage of 30 kV. The cross section of the D layer of the laminate was observed with a field-emission transmission electron microscope (device: "SU8000," manufactured by Hitachi High-Technologies Corporation), and the average dispersed particle diameter was calculated. The measurement conditions involved an accelerating voltage of 1 kV, and a magnification of 20,000 times. Of particles of the EVOH (y) having a particle diameter that fell within 9 μm×13 μm in terms of a region observed with the electron microscope, an average of the sizes of 10 particles in order from the largest particle was calculated as the average dispersed particle diameter, being 0.45 μm.

Furthermore, the laminate obtained in Example 27 was cut to A4 size (TD 210 mm×MD 297 mm), and flexion was repeated 1,000 times in an environment at 23° C. using a Gelvo-type flex tester manufactured by Tester Sangyo Co., Ltd. in accordance with ASTM-F392-74. Upon measuring the number of pin holes after flexing, there was 1 pin hole.

INDUSTRIAL APPLICABILITY

As, for example, a material required to have gas barrier properties, durability, elasticity, and the like, the laminate of the present invention can be used as a food packaging material, a container packaging material for medical treatment, other container packaging materials, a sheet material for industrial use, etc., and as a sheet material for architectural use, a sheet material for agriculture, a geomembrane, a radon barrier film, other sheet materials, as well as various other types of pipes, and the like. In particular, the laminate of the present invention can be suitably used as an inner liner for a tire, an air cushion material for a shoe sole, an inner package of an accumulator, an inflatable ball, an air spring, or the like, as well as a gas barrier film laminated on a filmy rubber product, etc., and unneeded parts such as the trim and/or the like can be effectively recycled.

The invention claimed is:

1. A laminate comprising:
    a gas barrier layer (A) which comprises an ethylene-vinyl alcohol copolymer (a); and
    a polyurethane layer (B) which comprises a thermoplastic polyurethane (b),
    wherein
    the laminate comprises a constitution comprising at least one set of the gas barrier layer (A) and the polyurethane layer (B) being directly laminated,
    a sum of numbers of the gas barrier layer (A) and the polyurethane layer (B) is 9 or more and 300 or less, and
    the gas barrier layer (A) comprises 10 ppm or more and 300 ppm or less, in terms of metal atoms, of a higher fatty acid metal salt (c) having 10 or more carbon atoms.

2. The laminate according to claim 1, wherein a metal atom constituting the higher fatty acid metal salt (c) comprises at least one selected from the group consisting of magnesium and cobalt.

3. The laminate according to claim 2, wherein the higher fatty acid metal salt (c) comprises at least one selected from the group consisting of magnesium stearate and cobalt stearate.

4. The laminate according to claim 1, wherein a content of an ethylene unit of the ethylene-vinyl alcohol copolymer (a) is 20 mol % or more and 60 mol % or less.

5. The laminate according to claim 1, wherein the gas barrier (A) and the polyurethane layer (B) are alternately laminated.

6. The laminate according to claim 5, wherein the polyurethane layer (B) comprises:
    a polyurethane layer (B1) on which the gas barrier layer (A) is directly laminated on both faces; and
    a polyurethane layer (B2) on which the gas barrier layer (A) is directly laminated on only one face.

7. The laminate according to claim 6, comprising a protective layer (D) being directly laminated on the polyurethane layer (B2), wherein
    the protective layer (D) comprises a thermoplastic polyurethane (x).

8. The laminate according to claim 7, wherein the protective layer (D) comprises an ethylene-vinyl alcohol copolymer (y).

9. The laminate according to claim 7, wherein an average thickness per layer of the protective layer (D) is 300 μm or more and 800 μm or less.

10. The laminate according to claim 1, wherein an average thickness per layer of the gas barrier (A) is 0.1 μm or more and 10 μm or less.

11. The laminate according to claim 1, wherein an average thickness per layer of the polyurethane layer (B) is 0.1 μm or more and 30 μm or less.

12. The laminate according to claim 1, wherein a ratio (gas barrier (A)/polyurethane layer (B)) of the average thickness per layer of the gas barrier (A) to the average thickness per layer of the polyurethane layer (B) is 0.1 or more and 1 or less.

* * * * *